United States Patent
Heo et al.

(10) Patent No.: US 9,430,024 B2
(45) Date of Patent: *Aug. 30, 2016

(54) ULTRA LOW POWER APPARATUS AND METHOD TO WAKE UP A MAIN PROCESSOR

(71) Applicant: Samsung Electronics Co., Ltd., Gyeonggi-do (KR)

(72) Inventors: Changryong Heo, Gyeonggi-do (KR); Kenhyung Park, Gyeonggi-do (KR); Kiyeon Park, Gyeonggi-do (KR); Yongyi Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 294 days.

This patent is subject to a terminal disclaimer.

(21) Appl. No.: 14/011,089

(22) Filed: Aug. 27, 2013

(65) Prior Publication Data

US 2014/0075226 A1      Mar. 13, 2014

Related U.S. Application Data

(63) Continuation-in-part of application No. 13/595,119, filed on Aug. 27, 2012, now Pat. No. 9,063,731.

(30) Foreign Application Priority Data

Jul. 26, 2013   (KR) .................. 10-2013-0088382

(51) Int. Cl.
*G06F 1/32*   (2006.01)

(52) U.S. Cl.
CPC ........... *G06F 1/3234* (2013.01); *G06F 1/3206* (2013.01); *G06F 1/3209* (2013.01); *G06F 1/3215* (2013.01); *G06F 1/3293* (2013.01); *Y02B 60/121* (2013.01)

(58) Field of Classification Search
CPC .. G06F 1/3293; G06F 1/3287; G06F 1/3243; G06F 1/3231
USPC ......................................... 713/320, 323, 324
See application file for complete search history.

(56) References Cited

U.S. PATENT DOCUMENTS 6,070,140 A    5/2000   Tran
7,176,902 B2   2/2007   Peterson, Jr. et al.
(Continued)

FOREIGN PATENT DOCUMENTS

EP   2 482 167 A1    8/2012
JP   2011-139301 A   7/2011
(Continued)

OTHER PUBLICATIONS

European Search Report dated Jul. 1, 2016.

*Primary Examiner* — Vincent Tran
(74) *Attorney, Agent, or Firm* — Cha & Reiter, LLC

(57) ABSTRACT

An apparatus and method for waking up a main processor (MP) in a low power or ultra-low power device preferably includes the MP, and a sub-processor (SP) that utilizes less power than the MP to monitor ambient conditions than the MP, and may be internalized in the MP. The MP and SP can remain in a sleep mode while an interrupt sensor monitors for changes in the ambient environment. A sensor is preferably an interrupt-type sensor, as opposed to polling-type sensors conventionally used to detect ambient changes. The MP and SP may remain in sleep mode, as a low-power or an ultra-low power interrupt sensor operates with the SP being in sleep mode, and awakens the SP via an interrupt indicating a detected change. The SP then wakes the MP after comparing data from the interrupt sensor with values in storage or with another sensor.

19 Claims, 12 Drawing Sheets

(56) References Cited

U.S. PATENT DOCUMENTS

| | | |
|---|---|---|
| 7,633,076 B2 | 12/2009 | Huppi et al. |
| 8,072,379 B2 | 12/2011 | Gopinath |
| 8,145,053 B2 | 3/2012 | Sakurai |
| 8,230,246 B1 | 7/2012 | Sharkey |
| 8,706,172 B2 | 4/2014 | Priyantha et al. |
| 8,912,877 B2* | 12/2014 | Ling ................. G06F 1/3203 340/3.1 |
| 2002/0180724 A1 | 12/2002 | Oshima et al. |
| 2003/0040339 A1 | 2/2003 | Chang |
| 2003/0177402 A1 | 9/2003 | Piazza |
| 2006/0161377 A1 | 7/2006 | Rakkola et al. |
| 2007/0102525 A1 | 5/2007 | Orr et al. |
| 2007/0140199 A1 | 6/2007 | Zhao et al. |
| 2009/0135751 A1 | 5/2009 | Hodges et al. |
| 2009/0259865 A1* | 10/2009 | Sheynblat ............ G06F 1/3203 713/323 |
| 2009/0278738 A1 | 11/2009 | Gopinath |
| 2010/0007801 A1* | 1/2010 | Cooper ................ G06F 1/3203 348/730 |
| 2010/0013778 A1 | 1/2010 | Liu et al. |
| 2010/0235667 A1 | 9/2010 | Mucignat et al. |
| 2010/0302028 A1 | 12/2010 | Desai et al. |
| 2010/0306711 A1 | 12/2010 | Kahn et al. |
| 2010/0313050 A1 | 12/2010 | Harrat et al. |
| 2011/0071759 A1 | 3/2011 | Pande et al. |
| 2011/0077865 A1 | 3/2011 | Chen et al. |
| 2011/0126014 A1* | 5/2011 | Camp, Jr. ............ H04W 12/04 713/171 |
| 2011/0162894 A1 | 7/2011 | Weber |
| 2012/0096290 A1* | 4/2012 | Shkolnikov ............ G06F 1/325 713/320 |
| 2012/0100895 A1 | 4/2012 | Priyantha et al. |
| 2012/0154292 A1 | 6/2012 | Zhao et al. |
| 2013/0082939 A1 | 4/2013 | Zhao et al. |
| 2014/0006825 A1* | 1/2014 | Shenhav ............. G06F 1/3206 713/323 |
| 2014/0025973 A1 | 1/2014 | Schillings et al. |
| 2014/0049480 A1 | 2/2014 | Rabii |
| 2014/0075226 A1* | 3/2014 | Heo ..................... G06F 1/3234 713/323 |
| 2014/0149754 A1* | 5/2014 | Silva ................... G06F 1/3212 713/300 |
| 2014/0237277 A1* | 8/2014 | Mallinson ........... G06F 1/3206 713/323 |

FOREIGN PATENT DOCUMENTS

| | | |
|---|---|---|
| KR | 10-0748984 B1 | 8/2007 |
| KR | 10-2010-0061894 A | 6/2010 |
| KR | 10-2011-0071216 A | 6/2011 |

\* cited by examiner

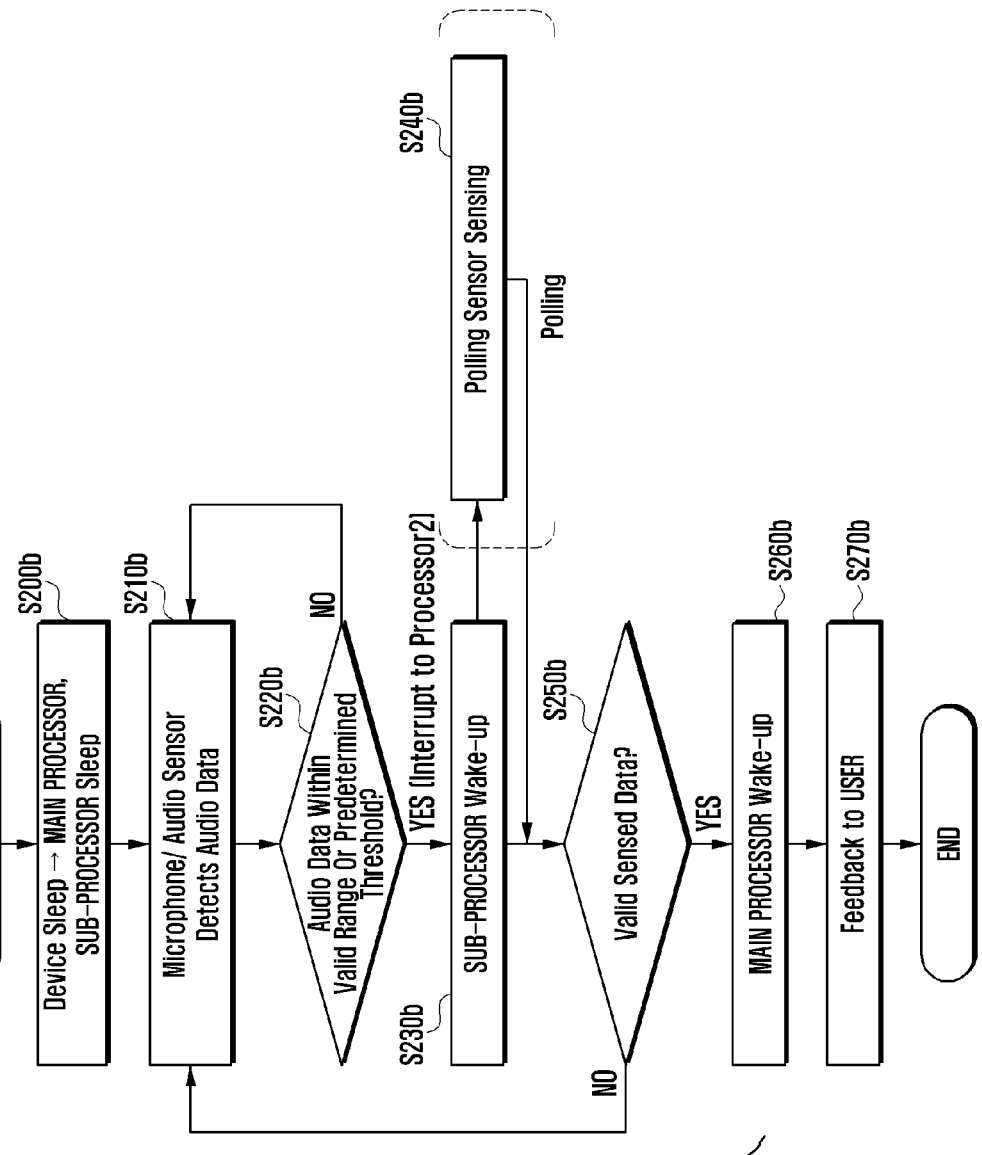
FIG. 2B
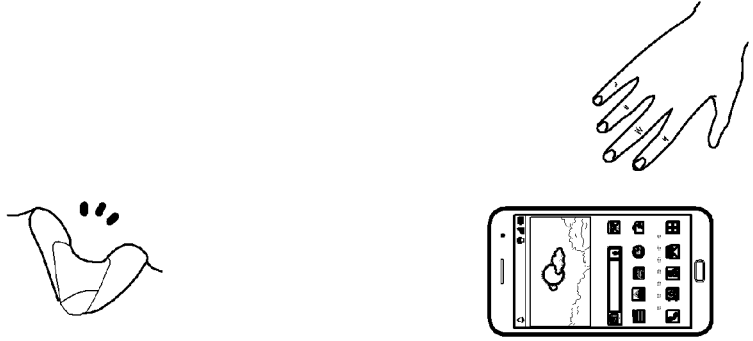

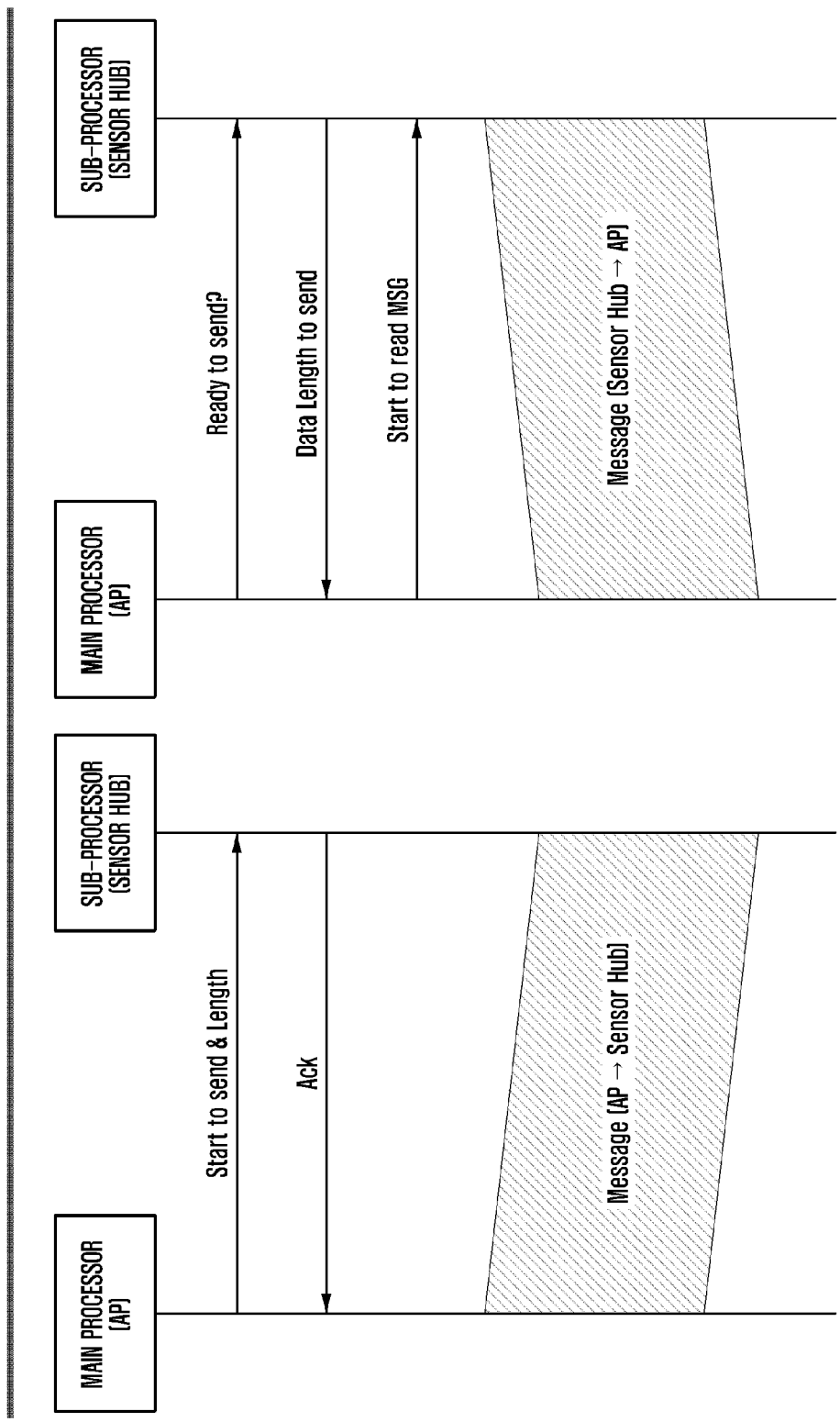

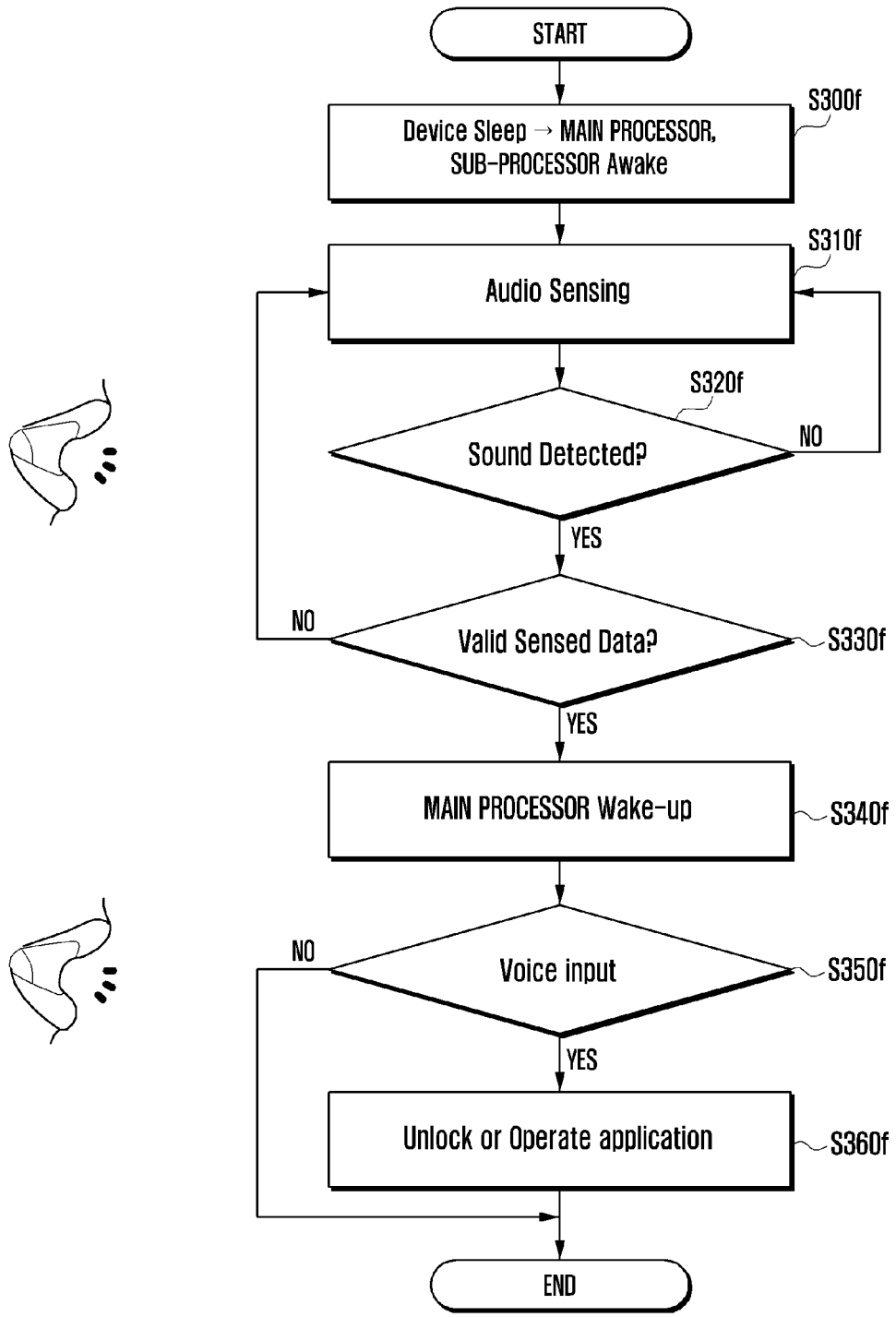

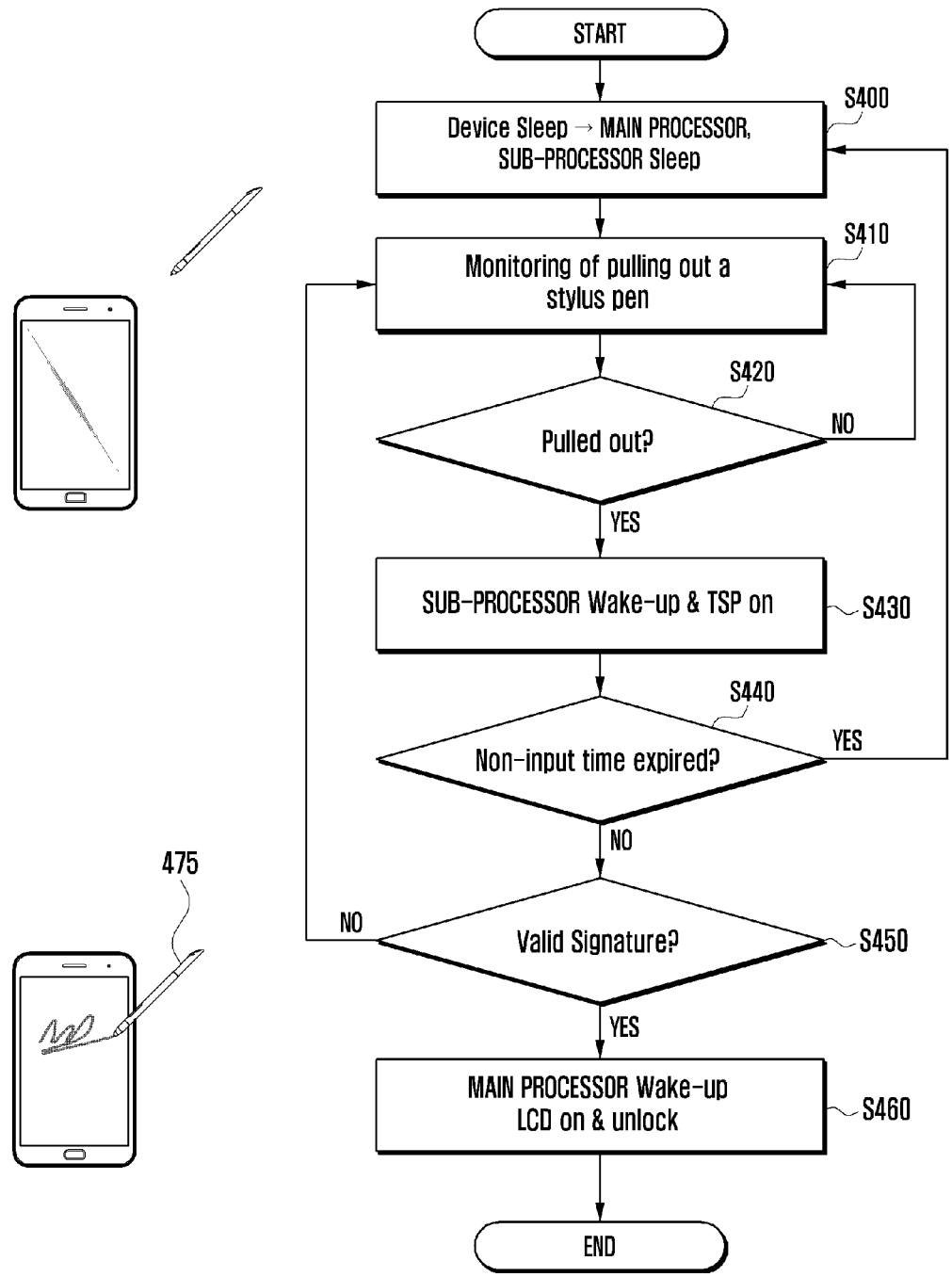

ULTRA LOW POWER APPARATUS AND METHOD TO WAKE UP A MAIN PROCESSOR

CROSS RELATED APPLICATION

This application is a CIP of U.S. patent application Ser. No. 13/595,119 filed on Aug. 27, 2012 and entitled and claims the benefit of an earlier Korean Patent application filed in Korean Intellectual Property Office on Jul. 26, 2013 and assigned Serial No. 10-2013-0088382, the entire disclosure of which is hereby incorporated by reference.

BACKGROUND

1. Field of the Invention

The present disclosure relates to generally method and apparatus for wake up an electronic device having a sensor. More particularly, the present invention relates to method and apparatus for wake-up an electronic device having a sensor, thereby reducing battery power utilized by the portable devices and facilitate a return of the electronic device to operation from a sleep mode.

2. Description of the Related Art

In order to save power, which is of particular importance to battery powered devices, conventionally a "sleep mode" has been utilized, typically when the electronic device is an idle state for a predetermined amount of time.

Battery usage in portable electronic devices is critical. A few examples of the many types of devices where battery usage is critical include but are not limited to, cell phones, smart phones, tablets, personal digital assistants (PDA's), portable music players, etc. Furthermore, continues to be a need to provide more functionality, while at the same time reducing battery power usage.

Conventional devices, wherein after a period of time of non-usage, may dim the brightness of the display, or the display goes blank to conserve energy.

For example, with regard to computers, a sleep mode is defined as an energy-saving standby condition of the computer, wherein the computer can be reactivated by an external stimulus, such as touching the keyboard. For example, when a notebook computer goes into sleep mode, the display screen and disk drive are normally shut down. Once awakened (e.g. by being sent a specific signal), the computer returns to its former operating state.

Moreover, in the case of portable electronic devices, a sleep mode may be operated in many different types of devices, for example, smartphones, tablets, music players, Personal Digital Assistant (PDAs), just to name a few possibilities.

In fact, many smartphones now default to a sleep mode when not used, unless actively performing certain tasks. When there are no active user interactions such as screen touches, every component, including the central processor, may be powered down unless an application instructs the operating system to keep the device or certain components thereof, fully powered on.

Moreover, a number of background operations may need to be performed while the phone is idle. In one such example, a user may need to automatically update an email folder by checking with a remote server. To prevent the phone from going to sleep during such operations, smartphone manufacturers often make application programming interfaces, or APIs, available to app developers. The developer may insert an APIs into one or more apps to instruct the phone to stay awake long enough to perform necessary operations.

In a typical smartphone, an Application Processor (AP) is asleep when the device is asleep. In order to wake up the device, conventional systems require the user to provide a physical input, for example press a power button or an unlock button.

Using a sleep mode or sleep state saves battery power, particularly when compared with leaving a device in a fully operational mode or state while idle, and advantageously permits the user to avoid having to reset programming codes or wait for an electronic device to reboot. In wireless electronic devices, such as portable mobile terminals, tablets, etc., which often seek out networks and have to provide passwords (or have passwords provided to them) to obtain access upon being rebooted or reset, the use of sleep mode is preferable to a rather cumbersome and slow process or rebooting.

However, to return to an electronic device an operational mode (e.g. wake mode) from a sleep mode requires an action to be undertaken by the user. For example, a power button or an unlock icon must be pressed, which is slow and sometimes awkward, especially when trying to quickly perform an action on the electronic device. Even in the case of the electronic device providing a virtual keypad, an unlock icon must be touched, swiped or spread in order to restore the electronic device to an operational mode, meaning that the user is inconvenienced by being required to contact a button of the device, or slide their finger along a screen.

Some conventional attempts to solve some of the shortcomings include providing a luminance sensor or a camera. However, in such cases the application processor (AP) cannot go into sleep mode and must always be in an operating mode in order to monitor and process sensed data from the sensor or camera. This type of monitoring requires a high amount of power consumption, as it is impossible to control the sensor by the AP directly when the AP is asleep.

Recently, the use of a lower power processor for processing only the sensing data has been configured into the devices. However, the low power processor processes data from the sensor using a polling type, and must be maintained in a wake-up state, using significant amounts of power.

With regard to conventional attempts to address the above-discussed issues, U.S. Pat. Appln. Pub. No. 20100313050 discloses that a sensor processor system selects a power profile to be applied to the application processor system based on the sensed data, and instructs the power management controller to apply the selected power profile to the application processor system. There are two processors used for low power sensing that wakes up the AP when the sensed data meets the condition.

However, a significant drawback to U.S. Pat. Appln. Pub. No. 2010/0313050 is that the sensor processor always operates to monitor ambient environment using a polling type sensor without a sleep mode. The sensor processor applies the power profile to the application processor system (S/W type).

In another conventional attempt to improve the art, in U.S. Pat, Appln. Pub. No. 2009/0259865, the electronic device includes a circuit configured to operate when the main processor is in the sleep mode. The circuit comprises at least one low power processor and a sensor. However, the low power processor in the conventional system always operates without being in sleep mode in order to be able to monitor ambient environment via a polling-type sensor.

Accordingly, there is a need in the art for a system and method that permits additional components to be in sleep mode and yet, provides ambient monitoring of the device, and can permit a switch back to an operating mode from sleep mode quickly without pressing buttons or touching the display screen.

SUMMARY OF THE INVENTION

The summary of the invention is not to be used as a basis to interpret a scope of the appended claims, as the claimed invention is far broader than the description in this summary.

An apparatus and method for waking up a main processor in an ultra-low power device preferably includes a main processor, and a sub-processor that utilizes less power than the main processor, and may be internalized in the main processor. According to an exemplary aspect of the presently claimed invention, at least one sensor is preferably an interrupt-type sensor (as opposed to, for example, a polling-type sensor). One of the many advantages of the presently claimed invention is that both the main processor and the sub-processor can remain in sleep mode, as a low-power or an ultra-low power sensor can operate with the sub-processor being in sleep mode and only awaken after receiving an interrupt signal from the interrupt sensor that a change has been detected.

In addition, the presently claimed invention also permits a return from sleep mode to operating mode by a mere wave of the hand, which is unknown heretofore. Also, shaking the unit, sensing an air pressure change from the shaking of the unit or waving of a hand, or sensing a change in acoustic pressure by receiving sound waves (audio data) by an audio sensor including but not limited to a microphone that is active in an ultra low-power mode and the audio data is within a valid range or has reached a predetermined threshold, or moving a stylus pen arranged along an exterior of the device, are all non-limiting examples of the many ways the device can be awakened from sleep mode.

BRIEF DESCRIPTION OF THE DRAWINGS

The above and other exemplary aspects of the invention will become more apparent from the following detailed description taken in conjunction with the accompanying drawings, in which:

FIG. 2B shows a flowchart illustrating an exemplary operation for gesture sensing according to an exemplary aspect of the invention;

FIG. 3D is an example of an AP processor communicating with a second processor hub, according to an AP to Hub protocol that can be used with the present invention;

FIG. 3F shows a flowchart illustrating an exemplary operation of a feedback voice input based on a wakeup from the sleep mode by audio data detection according to another exemplary aspect of the invention;

FIG. 4 shows a flowchart illustrating exemplary operation of a signature unlock based on stylus movement according to an exemplary aspect of the invention;

Figure 1:
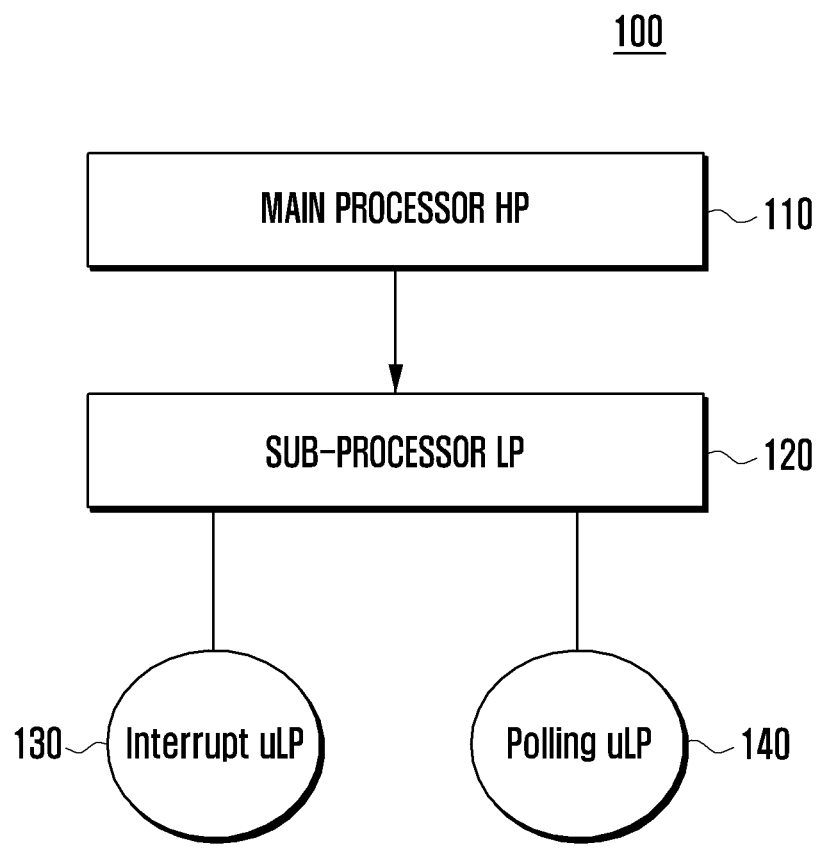
FIG. 1 shows a block diagram of an exemplary depiction of an apparatus according to an exemplary aspect of the invention.

It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and at least one of a low power processor and an ultra-low power sensor to monitor at least one of the signals, commands, inputs, and changes in the environment. The circuit wakes up the main processor responsive to one of the low power processor and the ultra-low power interrupt sensor.

DETAILED DESCRIPTION

The present invention has been described with respect to particular exemplary embodiments and with reference to certain drawings, but the invention is not limited thereto, but rather, is set forth only by the appended claims. The drawings described are only schematic and are non-limiting. In the drawings, for illustrative purposes, the size of some of the elements may be exaggerated and not drawn to a particular scale. Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B. This expression signifies that, with respect to the present invention, the only relevant components of the device are A and B.

Furthermore, the terms "first", "second", "third" and the like, if used in the description and in the claims, are provided for distinguishing between similar elements and not necessarily for describing a sequential or chronological order. It is to be understood that the terms so used are interchangeable under appropriate circumstances (unless clearly disclosed otherwise) and that the exemplary embodiments of the invention described herein and may be operated in other sequences and/or arrangements than are described or illustrated herein.

DEFINITIONS

To aide in an understanding of the present invention, an artisan should understand and appreciate that the terms "main processor" and sub-processor" are terminologies used for understanding of the present invention, but that other terminologies can be interchangeably used in place of main processor and sub-processor having the same meaning.

For example, to aid the artisan, the term "main processor", can be regarded herein as interchangeable with any one of the terms an "application processor", "AP", "first processor", and "processor 1", which are all used herein all refer to the same processor 110 that is shown in FIG. 1. For example A high power processor (e.g. a "high-power" processor) having a first operating power level can be referred to as a main processor, or an application processor. The first operating power level may be an operating power that is greater than or equal to a first threshold. The main processor (or application processor) is typically considered as high power relative to the low power sub-processor or sensing processor.

In addition, the term "sub-processor", can be regarded herein as interchangeable with any one of the terms "sensing processor", "MCU", "second processor", "processor 2", "Sensor Hub (Processor)", "MCU (Micro Controller Unit)", which are all used herein to refer to the same processor 120 that is shown in FIG. 1. An ultra-low power processor may refer to any of the above.

A low-power processor having a second operating power level (the second operating power level being lower than the first operating power level) may be referred to as a sub-processor, or a sensing processor. The second operating power level may be an operating power that is lower than the first threshold. The second operating power level may also be an operating power that is greater than or equal to a second threshold (the second threshold being lower than the first threshold). Herein, the term "ultra-low power" refers to a third operating power level that is lower than the second operating power level. The third operating power level may be an operating power that is lower than the second threshold.

An artisan understands and appreciates that the term "ultra-low power" used in connection with a component (e.g. a processor or sensor) may refer to component (e.g. a processor or sensor) operating at power consumption values using less than approximately 1 mA, for example in the µA range (e.g. 1-999 µA) or lower. That is, in certain embodiments, the expression "Ultra-low power levels" may refer to power consumption at a level less than approximately 1 mA.

In addition, the artisan also understands and appreciates that the term "low power" used in connection with a component (e.g. processor or sensor) may refer to a component (e.g. sub-processor or sensor) operating in the 1-10 mA range.

In addition, the skilled person will also understand and appreciate that, in certain exemplary embodiments, the term "high power" used in connection with a component (e.g. processor or sensor) may refer to a component (e.g. processor (e.g. main-processor) or sensor) operating above 10 mA.

In certain exemplary embodiments, the first threshold may be 10 mA and the second threshold may be 1 mA. The skilled person will understand that other values may be used in various embodiments.

In some embodiments, the first, second and/or third operating power levels may have certain numerical relationships with each other. For example, the second operating power level may be at least a certain factor (e.g. 5 or 10) lower than the first operating power level, and/or the third operating power level may be at least a certain factor (e.g. 5 or 10) lower than the second operating power level or at least a certain factor (e.g. 25 or 100) lower than the first operating power level. Similarly, the first and second thresholds may have a certain numerical relationship to each other (e.g. at least a certain factor difference). Other numerical relationships are possible. The apparatus may comprise a wireless communication device, such as a mobile communication terminal, a cellphone, smart phone, tablet, Personal Digital Assistant (PDA), notebook, netbook, etc. just to name a few possible non-limiting examples of devices.

FIG. 1 shows a block diagram of an exemplary depiction of an apparatus 100 according to an exemplary aspect of the invention that includes a main processor (e.g. a high power, HP, Processor) in the form of, for example, an application processor, a sub-processor 120 (e.g. a low power, LP, processor) that receives information from one or more sensors such as interrupt uLP sensor 130 (ultra-low power) and a polling 140 (that may or may not be ultra-low power).

The sub-processor 120 operates at a low power or ultra-low power, and according to the present invention, the sub-processor can remain in a sleep mode along with the main processor 110 because of the use of an interrupt sensor 130. As discussed herein above, the conventional apparatus uses only a polling sensor that requires either the main processor or the sub-processing to remain fully operational to be able to have the device change from sleep mode to operational mode.

The interrupt sensor 130 operates at ultra-low power levels and sends an interrupt signal to the sub-processor 120 when a predetermined condition is sensed, The predetermined condition may be, for example, a user waiving their hand in front of the display, shaking the device, or moving a piece of the device, such as shifting a position of a stylus 475 (FIG. 4) or part of the cover. In addition, the interrupt sensor 130 may also comprise a pressure sensor, such as an audio sensor including but not limited to a microphone that senses acoustic pressure in the form of sound waves (audio data), and the microphone is active at ultra-low power levels and detects audio data the while the main processor 110 and the sub-processor 120 are asleep. According to the present invention, the interrupt sensor 130 is operable while the sub-processor 120 is in sleep mode (e.g. a mode in which power consumption is lower than when in a normal operating mode), However, the polling sensor 140 requires the sub-processor to be in an awake mode or operating mode (not in sleep mode).

Figure 2A:
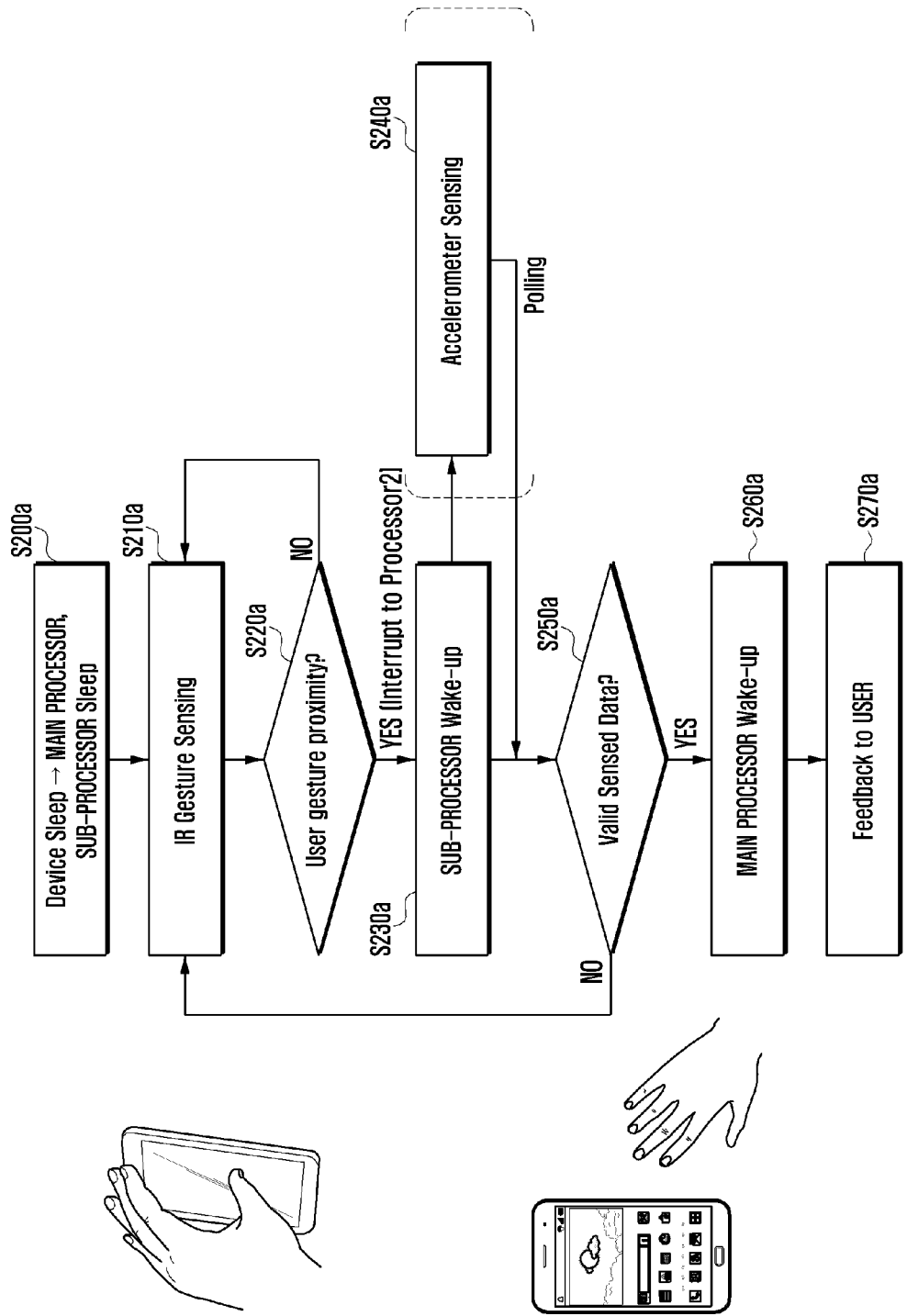
FIG. 2A shows a flowchart illustrating an exemplary operation for gesture sensing according to an exemplary aspect of the invention.

FIG. 2A shows a flowchart illustrating an exemplary operation for gesture sensing according to an exemplary aspect of the invention.

At step 200a, the main processor 110 and sub-processor 120 are in sleep mode. At steps 210a and 220, an interrupt sensor 130 (including but not limited to an infrared (IR) sensor) detects or senses gestures occurring within a certain distance (e.g. proximity distance) of the electronic device, for example with the proximity distance from a display or touchscreen of the electronic device. The proximity distance can be, for example, 10-15 cm, in some exemplary embodiments. The skilled person will appreciate that embodiments of the present but the invention d are not limited to using a specific distance, so long as the sensor can recognize the wave of the user's hand.

At step 230a, the sub-processor 120 is awakened by the interrupt signal sent from the interrupt sensor 130. Alternatively, at step 240a an accelerometer may detect the device being shaken or waived, and also cause the sub-processor 120 to be awakened.

At step 250a, the sub-processor determines whether or not the sensed data from the interrupt sensor 130 is valid by comparing the data value with a table in storage. Herein, sensed data may be regarded as valid if a value corresponding to, or derived from, the sensor output satisfies a numerical condition, for example (i) is greater than a threshold, (ii) is lower than a threshold, or (iii) falls within a range of values. For example, if a value corresponding to the output of a motion sensor exceeds a threshold, this may indicate that more than a certain amount of motion has been sensed by the motion sensor. Thus, in this example, sensed data may be regarded as valid if more than a certain amount of motion is sensed.

In addition, a polling sensor 130 can be optionally included so that when the mobile device is placed in a case or bag, the interrupt sensor does not unintentionally operate. Accordingly, the sub-processor wakes up due to the interrupt from the interrupt sensor, and the main processor wakes up when 1) sensing data of the interrupt sensor is valid (e.g. within valid range) or 2) when sensing data of the polling sensor is valid (e.g, within a valid range), with 1) or 2) being determined by the sub-processor at step 250*a*.

After determining by the sub-processor 120 that the data is valid, for example, by being in a valid range, or having exceeded reached a predetermined threshold, the sub-processor 120 at step 260*a* then wakes the main processor 110, which in turn at step 270*a* provides feedback to the user, in the form of, for example, unlocking the screen, prompting the user, making the display operable, showing a home screen, etc. According to an exemplary aspect of the present invention, the predetermined threshold may be a particular value wherein, if the output (e.g. sensor data) is greater than or equal to the particular value the sub-processor determines that the wake up condition(s) is/are satisfied. In addition, there may be a range of values received from the sensor that are predetermined as satisfying a wakeup condition, For example, the predetermined range may be a microvolt μv (or microamp μa) range or any other suitable range (e.g. milliamp, ma, range) that is within the capability of the sub-processor to distinguish between values received from the sensor so as ascertain a valid range. Furthermore, any suitable predetermined threshold may be used. The skilled person will appreciate that the present invention is not limited to the specific examples described.

FIG. 2B shows a flowchart illustrating an exemplary operation for audio sensing while the main processor and sub-processor are asleep according to an exemplary aspect of the invention.

At step 200*b*, the main processor 110 and sub-processor 120 are in sleep mode. At steps 210*b* and 220*b*, an audio sensor 130 (including but not limited to a microphone) detects or senses audio (sound) within a valid range for a predetermined threshold.

At step 230, the sub-processor 120 is awakened by the interrupt signal sent from the interrupt sensor 130. Alternatively, at step 240*b* a polling sensor may optionally additionally collect data to determine whether sound is being received that is within a valid range (for example, a certain pitch, sound pressure (in dB), sound intensity, etc.).

At step 250*b*, the sub-processor determines whether or not the sensed data from the interrupt sensor 130 is valid by comparing the value with a table in storage.

Accordingly, with regard to the example of FIG. 2B, the sub-processor wakes up due to the interrupt from the interrupt sensor, and the main processor wakes up when 1) sensing data of the interrupt sensor is within valid range or 2) when sensing data of the polling sensor is within the valid range, with 1) or 2) being determined by the sub-processor at step 250.

After determining by the sub-processor 120 that the data is valid, for example, by being in a valid range, or has reached a predetermined threshold, the sub-processor 120 at step 260*b* then wakes the main processor 110, which in turn at step 270*b* provides feedback to the user, in the form of, for example, unlocking the screen, prompting the user, making the display operable, showing a home screen, etc. According to an exemplary aspect of the present invention, the predetermined threshold could be a particular value which if the output is greater than or equal to, is determined by the sub-processor as satisfying the wake up condition(s). In addition, there can be a range of range of values received from the sensor that are predetermined as satisfying a wakeup condition, that being provided only for purposes of illustration and not for limiting the appended claims, such as, for example a microvolt uv (or microamp ua) range. Any other such range (e.g. ma) that is within the capability of the sub-processor to distinguish between values received from the sensor so as to ascertain a valid range or predetermined threshold may be used. The skilled person will appreciate that the present invention is not limited to the specific examples described.

Figure 3A:
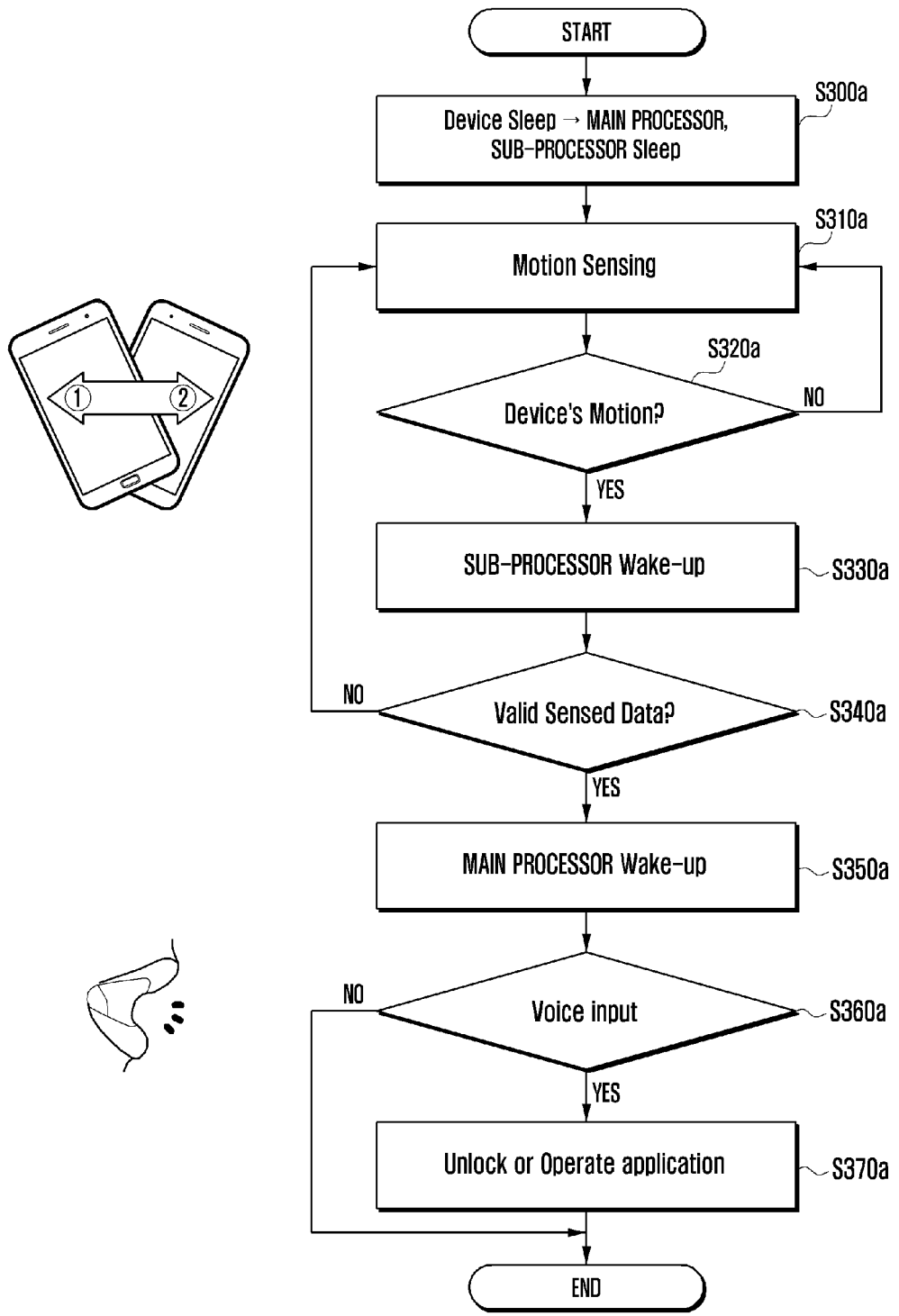
FIG. 3A shows a flowchart illustrating an exemplary operation of a feedback voice input based on device's motion according to an exemplary aspect of the invention.

FIG. 3A shows a flowchart illustrating an exemplary operation of a feedback voice input based on device's motion according to an exemplary aspect of the invention. This particular exemplary embodiment starts at step 300 with the main processor and sub-processor being asleep. A motion detector detects motion at step 310, by sensing the predetermined condition (which in this example is the device being shaken or waved) at step 320, and the interrupt signal is sent to the sub-processor 120 to wake up the sensing processor at step 330. Then the sub-processor at step 340 determines whether or not the sensed data is valid, by comparing with values in storage to determine if the data is within a valid range or has exceeded a predetermined threshold, for example. Upon determining that the sensed data from the interrupt sensor is valid, then at step 350 the sub-processor 120 wakes up the main processor 110. The main processor can be fully operable and wait, for example, for a voice input (step 360), and based on the determined voice input, can either unlock the display screen or execute a function or application (step 370). For further purposes of illustration and not to limit the claimed invention, exemplary protocol between the main processor and sub-processor is discussed herein. The protocol for transmitting is in accordance with the main processor and sub-processor's active or sleep state.

Figure 3B:
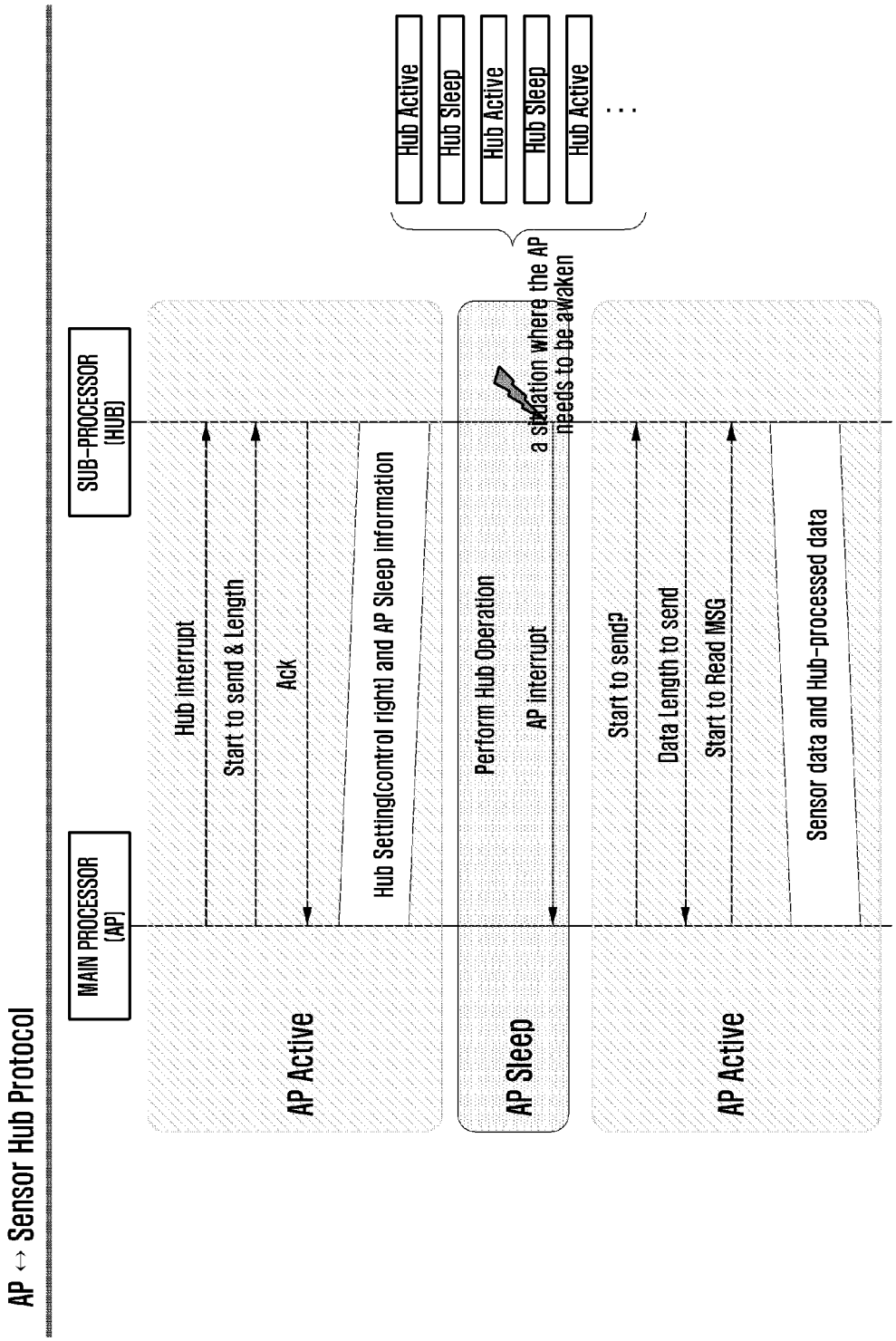
FIG. 3B is an exemplary overview of an AP Processor to Hub Processor Protocol according to an illustrative aspect of the present invention.

As shown in FIG. 3B, while the main processor is active, an exchange occurs between main processor and a sub-processor according to a HUB protocol. First, a hub interrupt is sent by the main processor to the sub-processor, and wherein the main processor starts to send length information (e.g. data length information) to the sub-processor. In turn, the sub-processor sends an acknowledgement back to the main processor. At this point, the hub (sub-processor) sets the control right and AP sleep information.

With continued reference to FIG. 3B, it can be seen that the sub-processor keeps varying states between active and sleep. When a situation arises where the main processor needs to be awakened, an AP interrupt id is sent from the sub-processor to the main processor. Once the main processor is awakened, the main processor remains in an active state and starts to send information to the sub-processor. In turn, the sub-processor indicates to the main processor the data length to send. Next the main processor starts to read a message from sub-processor, which can comprise sensor data and sub-processed data.

Figure 3C:
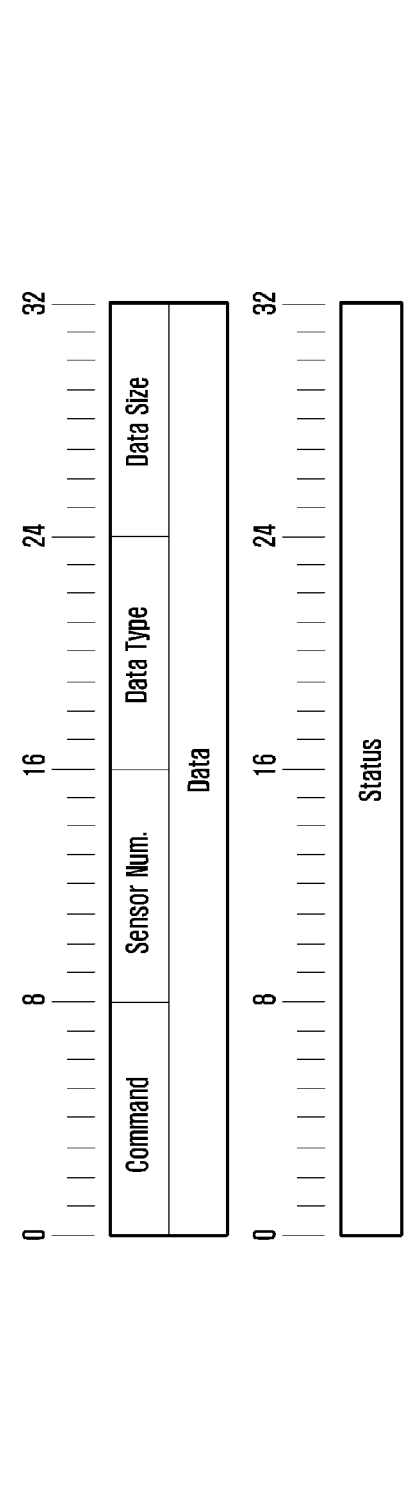
FIG. 3C is an example of a message frame that can be used with an AP to Hub Protocol according to an illustrative aspect of the present invention.

FIG. 3C shows an example of a main processor to sub-processor (i.e. AP to Hub Protocol Message Frame) that can be used according to an exemplary aspect of the present invention.

Referring now to FIG. 3C, it is shown that an exemplary frame can be 8 bytes, with a command field commanded by the AP (main processor) to the Hub (sub-processor), a sensor number field specifying a particular sensor, s data type showing the content of the operand being transmitted, a data size field providing the actual data that follows. Each of the aforementioned parts of the message frame can be 1 byte in length, and the data and status can be 4 bytes each so as to total 8 bytes, for example.

FIG. 3D shows another example of AP (main processor) to Hub (Sub-processor Protocol according to a non-limiting exemplary aspect of the present invention. These actions are similar to what is shown in FIG. 3B while the AP is in the active mode.

Figure 3E:
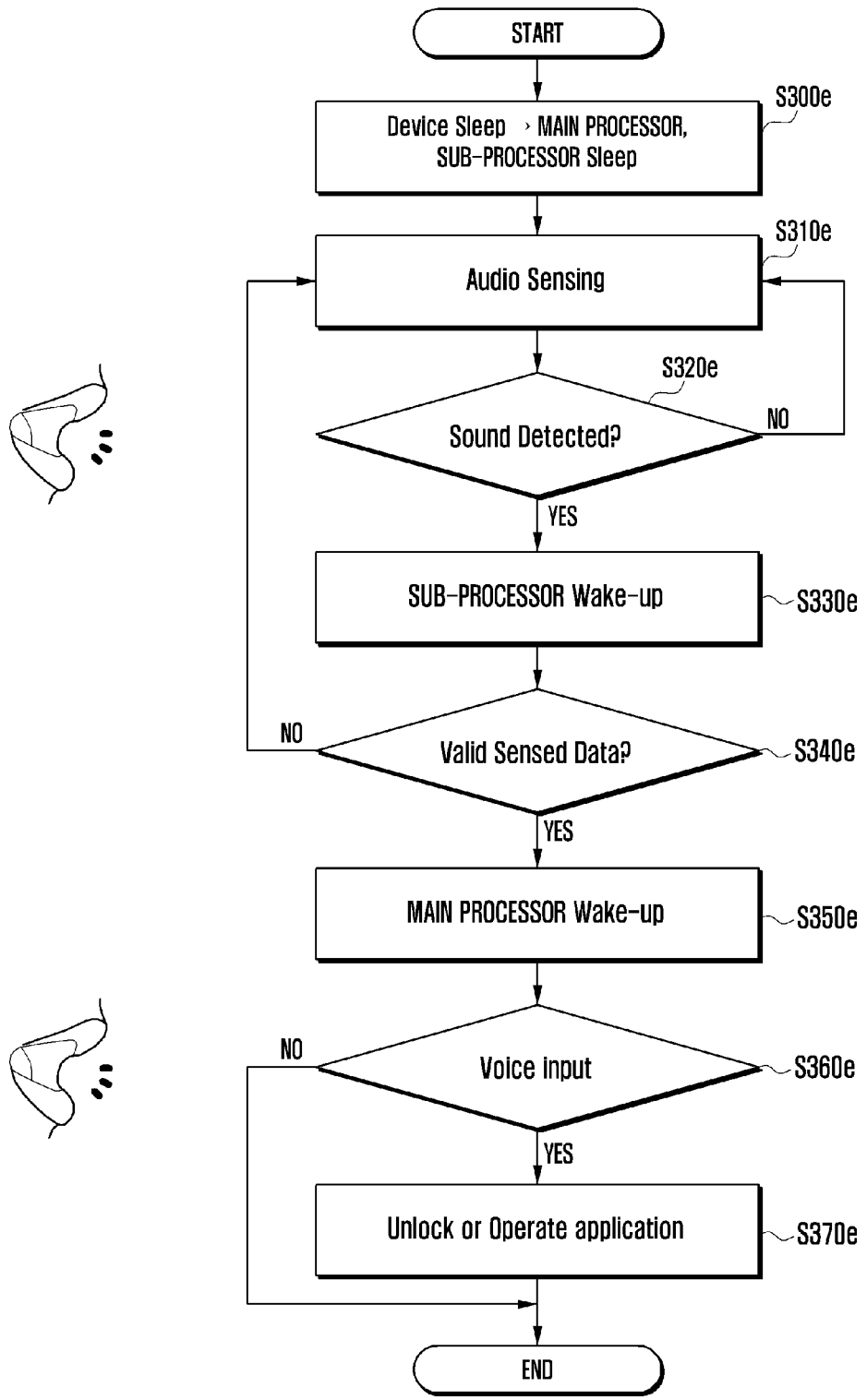
FIG. 3E shows a flowchart illustrating an exemplary operation of a feedback voice input based on a wakeup from the sleep mode by audio data detection according to another exemplary aspect of the invention.

FIG. 3E shows a flowchart illustrating an exemplary operation of a feedback voice input based on a wakeup from the sleep mode by audio data detection according to another exemplary aspect of the invention. This particular exemplary embodiment, in which the ultra low-power sensor 130 is a pressure sensor such as an audio sensor or a microphone, starts at step 300e with the main processor and sub-processor being asleep. An audio sensor including but not limited to a microphone operable while the main processor and sub-processor are asleep, receives audio data (sound pressure) at step 310e. It is determined at step 320e that audio data is detected, and the interrupt signal is sent to the sub-processor 120 to wake up the sensing processor at step 330e. Then the sub-processor at step 340 determines whether or not the sensed data is valid (for examples, valid data for an unlock function), by comparing with values in storage to determine if the data is within a valid range or has reached a predetermined threshold, for example. Upon determining that the sensed data from the interrupt sensor is valid, then at step 350e the sub-processor 120 wakes up the main processor 110. The main processor can be fully operable and wait, for example, for a voice input (step 360e), and based on the determined voice input, can or execute a function or application (step 370e). For further purposes of illustration and not to limit the claimed invention, exemplary protocol between the main processor and sub-processor is discussed herein. The protocol for transmitting is in accordance with the main processor and sub-processor's active or sleep state.

FIG. 3F shows a flowchart illustrating an exemplary operation of a feedback voice input based on a wakeup from the sleep mode by audio data detection according to another exemplary aspect of the invention.
This particular exemplary embodiment, in which the ultra lower power sensor 130 is an audio sensor or a microphone, starts at step 300f with the main processor being asleep and sub-processor being awake. An audio sensor including but not limited to a microphone operable while the main processor are asleep, and sub-processor are awake, receives audio data (sound pressure) at step 310f. It is determined at step 320f that audio data is detected, and the interrupt signal is sent to the sub-processor. Then the sub-processor at step 330f determines whether or not the sensed data is valid, by comparing with values in storage to determine if the data is within a valid range or has reached a predetermined threshold, for example. The sub-processor may control to unlock the display screen the electronic device when the voice is detected.

Upon determining that the sensed data from the interrupt sensor is valid, then at step 340f the sub-processor 120 wakes up the main processor 110. The main processor can be fully operable and wait, for example, for a voice command input (step 350f), and based on the determined voice command input, execute a function or application (step 360f), that is, the sensor according to the present invention, when the sub-processor is awakened, sends a sensed signal and sensing data to the sub-processor, the sub-processor may determines that the received sensed signal from the senor has sensing data received from the sensor changing in the predetermined condition.

FIG. 4 shows a flowchart illustrating exemplary operation of a signature unlock based on stylus movement according to an exemplary aspect of the invention.

With reference to FIG. 4, at step 400, the main processor and sub-processor are in sleep mode. At step 410, the presence of a stylus pen 475 is monitored to determine whether the stylus pen has been removed from a holder on the electronic device. At step 420, when it is determined that the stylus pen is removed, sub-processor wakes up at 430 and a non-input timer may be activated. If at step 440, the non-input timer has expired, the main processor and sub-processor go back to sleep mode, otherwise, at step 450 it is determined whether a signature (e.g. a signature written by the user on a touch screen of the electronic device) is valid e.g. by comparing to a pre-stored signature), and if so, then main processor wakes up, and the display LCD is turned on and unlocked (step 460).

Figure 5:
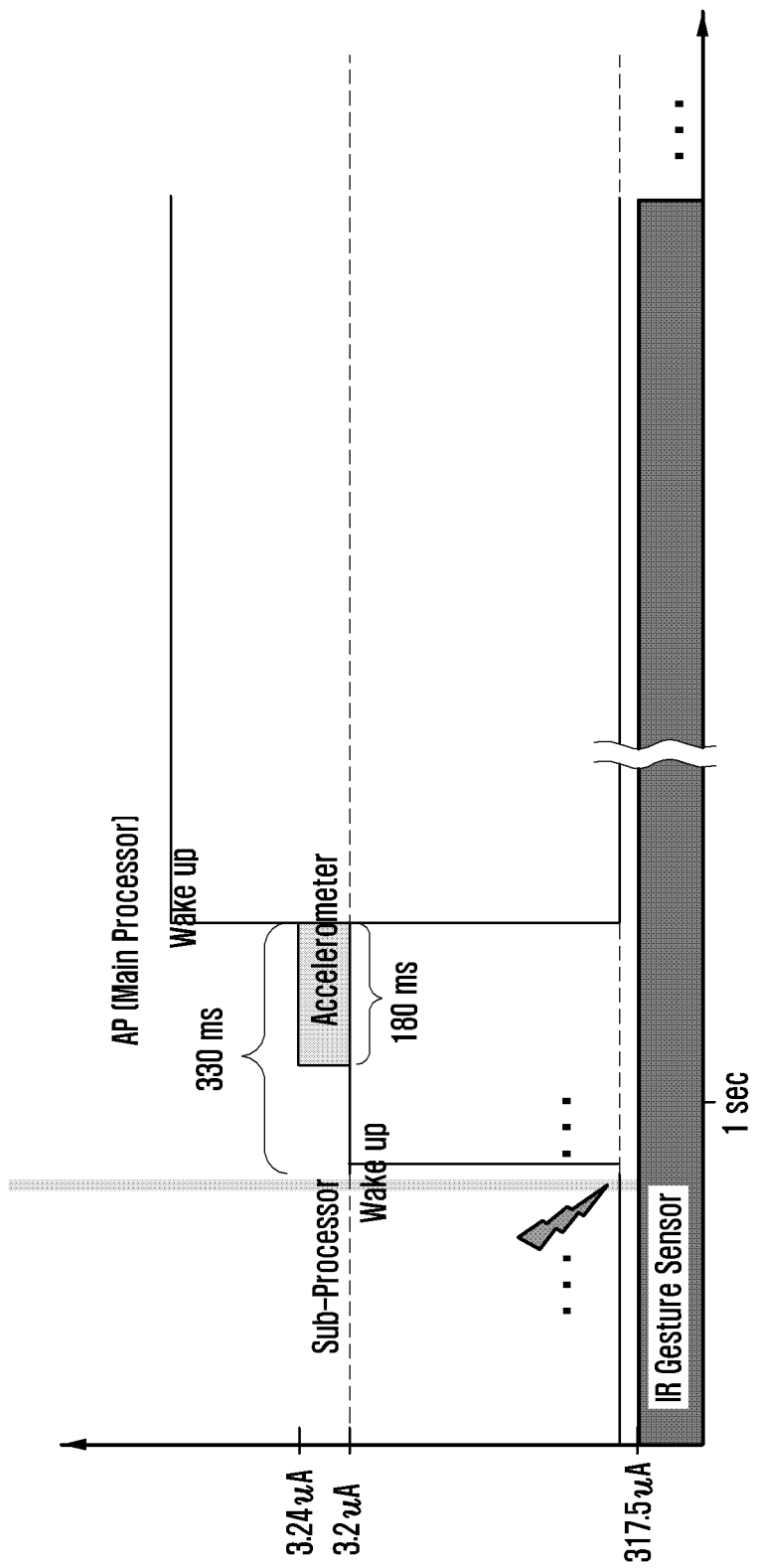
FIG. 5 shows a current profiling example according to an exemplary aspect of the invention.

FIG. 5 shows a current profiling example according to an exemplary aspect of the invention. In this particular non-limiting example, The X axis is time, and the Y-axis represents current consumption which may be of the order of milliampere (mA) or microampere (uA), for example.

As shown in FIG. 5, the IR gesture sensor (interrupt sensor) consumes at 317.5 uA of current. The sub-processor in this example consumes about 3.2 uA when awakened due to the IR gesture sensor sensing a change in the ambient condition. Within about 330 ms of waking up the sub-processor may wake up the main processor to perform a function, and upon doing so, the sub-processor goes back to sleep. The main processor consumes considerably more current than the sub-processor. Also, in the example of FIG. 5, it is shown that the accelerometer can cause the main processor to wake up within 180 ms.

Figure 6:
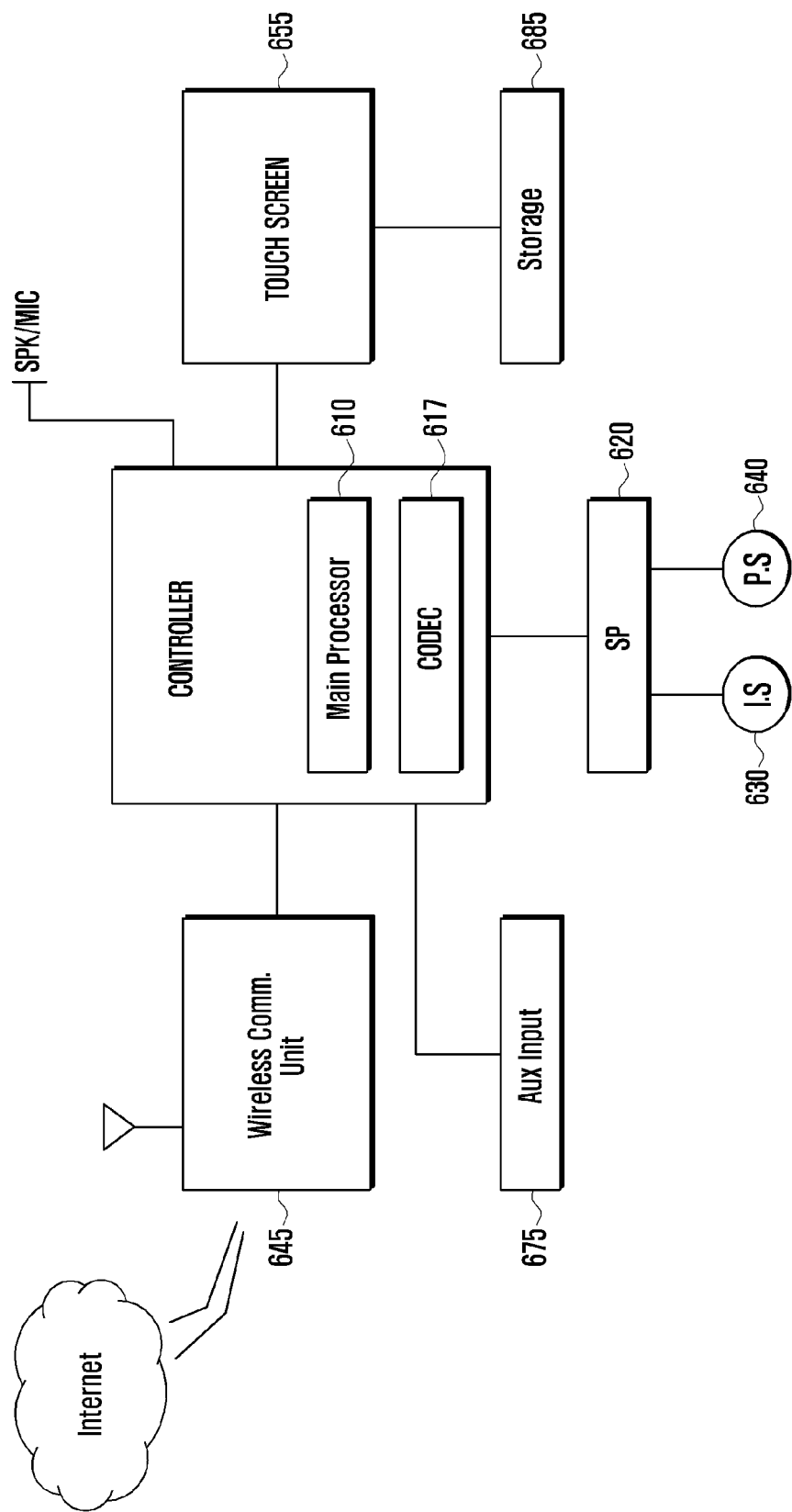
FIG. 6 shows an example of a wireless device incorporating the present invention.

FIG. 6 shows one possible example of a wireless device incorporating the present invention. An artisan understands and appreciates that a plurality of both wired and wireless devices can benefit from the claimed invention. Some non-limiting examples include smartphone, tablet, PDA, music player, etc. just to name a few examples. A controller includes the main processor 610 and a codec 617, the controller communicates with sensing processor 620. The interrupt sensor 630, which may be an audio sensor or microphone that operates when the sub-processor and main processor are asleep, and the polling sensor 640 are shown schematically, but their actual proximity to the controller maybe different than shown.

Touch screen 655 permits display and entry of data. Storage device 685 is in communication with the controller, and comprises a non-transitory machine readable medium.

Auxiliary input 675 can be any suitable type of input, for example a keyboard to a mouse, and wireless communication device, shown as a single box in FIG. 5, may comprise any number of different hardware modules for communication, for example for transmitting and receiving in short range communication such as Near Field Communication, Bluetooth, WLAN, 802.11, RF communications, etc.

In the invention, the ambient environment (e.g. the environment or volume surrounding the device or the physical state of the device) is monitored by an interrupt sensor, so that the sub-processor and the main processor (e.g. application processor) can remain together in sleep mode. Not only does the present invention provide an advantage of saving power, embodiments of the present invention also provide an advantage of increased the user convenience i since there is no requirement to push a button to activate/convert the device from a sleep mode back to a normal operating mode.

The sensing of a swiping near the device is sufficient to awake the device from sleep mode, or alternatively, shaking or waving the device, also restores the device to a normal operating state by waking it up.

It will be appreciated that embodiments of the present invention (e.g. methods and apparatus) can be realized in the form of hardware, software associated with hardware or any combination of hardware and software. For example The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote non-transitory recording medium or a non-transitory machine readable medium and to be stored on a local recording medium, so that the methods described herein can be rendered in such software that is stored on the recording medium using a general purpose computer, or a special processor or in programmable or dedicated hardware, such as, flash, an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

It will be appreciated that the storage devices and storage media are embodiments of non-transitory machine-readable storage that are suitable for storing a program or programs comprising instructions that, when executed, implement embodiments of the present invention. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same. The invention under a broadest reasonable interpretation is statutory subject matter and not software per se.

While the invention has been shown and described with reference to certain exemplary embodiments thereof, it will be understood by those skilled in the art that various changes in form and detail may be made therein without departing from the scope of the invention, as defined by the appended claims.

We claim:

1. A method of waking up a main processor in an ultra-low power electronic device, said method comprising:
    monitoring for a predetermined condition by sensor coupled to a sub-processor when the sub-processor that controls the sensor is in a sleep mode;
    sending by the sensor a data signal to the sub-processor upon sensing a change in the predetermined condition being monitored, said sub-processor being configured to wake up from sleep mode upon receiving the data signal and evaluate data received from the sensor to determine whether or not to wake up a main processor; wherein when the sub-processor determines that the data signal received from the sensor has reached a predetermined threshold value or is within a predetermined range of validity, the sub-processor sending a wake up signal to wake up the main processor that is coupled to the sub-processor,
    wherein the sensor comprises an audio sensor or microphone that senses sound received that is within a predetermined range or has reached a predetermined threshold value, and
    wherein the audio sensor or microphone is coupled to the sub-processor, and when the sub-processor wakes the main processor, determining by the main processor whether an audible sound is a voice input to unlock or operate an application.

2. The method according to claim 1, wherein the sensor is an interrupt sensor.

3. The method according to claim 2, wherein the sensor comprises at least one of an ultra-low power microphone, piezoelectric sensor, pressure sensor, motion sensor, IR gesture sensor, accelerometer, gyro sensor that is active while main processor is in sleep mode.

4. The method according to claim 1, wherein the predetermined condition being monitored comprises a voice through the microphone.

5. The method according to claim 4, wherein after the voice is detected and the sub-processor is awakened, unlocking the electronic device.

6. The method according to claim 1, wherein after the main processor is awakened, operating the electronic device after determining receipt of a voice command.

7. The method according to claim 1, wherein the sensor, when the sub-processor is awakened, sends a sensed signal and sensing data to the sub-processor, the sub-processor determines that the received sensed signal from the sensor has sensing data received from the sensor changing in the predetermined condition.

8. The method according to claim 1, wherein the predetermined condition comprises an ambient environment of the electronic device, and the sensor monitors the ambient environment either periodically or continuously.

9. The method according to claim 1, wherein the sub-processor comprises one of a sensing processor, a sensor hub, and a Micro Controller Unit (MCU).

10. An ultra-low power wake up apparatus comprising:
    a sub-processor including an interface for communicating with a main processor, the sub-processor having at least a sleep mode and an operating mode;
    a sensor in communication with the sub-processor, said sensor monitors a predetermined condition when the main processor is in the sleep mode;
    wherein said sensor sends an interrupt signal to the sub-processor upon sensing a change in the condition being monitored, said sub-processor being configured to wake up from the sleep mode and evaluate data provided from the sensor; and
    wherein said sub-processor being further configured to send a wake up signal over the communication interface to wake up the main processor for identifying data provided from the sensor when the sub-processor determines that the data received from the sensor is at a predetermined threshold value or within a predetermined range of validity, wherein the sensor comprises an audio sensor or microphone that senses sound received that is within a predetermined range or has reached a predetermined threshold value, wherein the audio sensor or microphone is coupled to the sub-processor, and when the sub-processor wakes the main processor, the main processor determines whether an audible sound is a voice input to unlock or operate an application.

11. The apparatus according to claim 10, wherein the sensor is an interrupt sensor.

12. The apparatus according to claim 11, wherein when the interrupt sensor comprises the microphone, when both the sub-processor and processor are in a sleep mode the microphone is active to detect sound.

13. The apparatus of claim 11, wherein said apparatus comprises a portable communication terminal configured for wireless communication comprising:
 a controller including the main processor and the sub-processor;
 a non-transitory memory;
 an RF communication unit coupled to the controller;
 a touchscreen;
 a network communication unit; and
 an interrupt sensor sending the interrupt signal to the sub-processor upon detecting a change in an ambient environment of the portable communication terminal.

14. The apparatus according to claim 10, wherein the sensor comprises at least one of an ultra-low power microphone, piezoelectric sensor, pressure sensor, motion sensor, IR gesture sensor, accelerometer, gyro sensor that is active while the main processor is in sleep mode.

15. The apparatus according to claim 14, wherein the predetermined condition being monitored comprises a voice through the microphone.

16. The apparatus according to claim 10, wherein the sub-processor is configured to unlock the low power wake up apparatus when a voice is detected, the main processor configured to operate the low power wake up apparatus.

17. The apparatus according to claim 10, wherein the sensor, when the sub-processor is awakened, sends a signal comprising sensing data to the sub-processor, the sub-processor determines whether a change has occurred in the predetermined condition that necessitates waking the main processor.

18. The apparatus according to claim 10, wherein the sensor is configured to operate at an ultra-low power level and senses whether a change in the predetermined condition being monitored occurs, and the sensor sends an interrupt to the sub-processor upon detection of the change in the predetermined condition being monitored.

19. The apparatus according to claim 10, wherein the audio sensor comprises an ultra low-power microphone.

* * * * *